J. C. SEBRING.
Grain Mill.
No. 229,919.  Patented July 13, 1880.
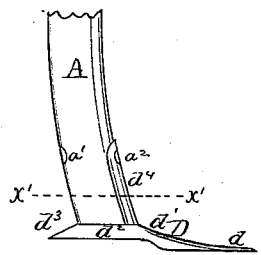
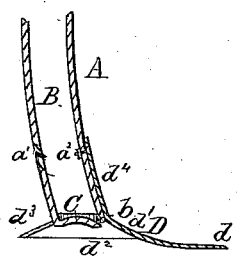
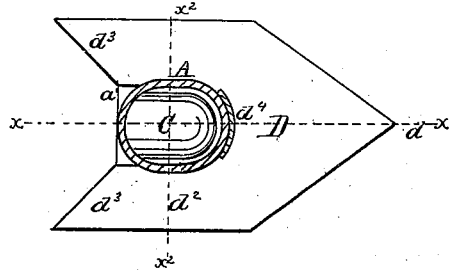
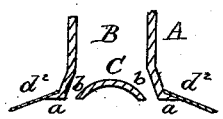
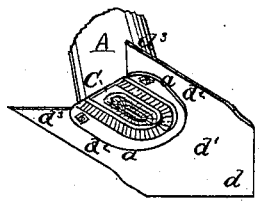
Witnesses:
Geo. H. Knight
Walter Allen
Inventor:
Joseph C. Sebring
By Knight Bros.
Attys.

UNITED STATES PATENT OFFICE.

JOSEPH C. SEBRING, OF MILL CREEK TOWNSHIP, WABAUNSEE COUNTY, KANSAS.

GRAIN-DRILL.

SPECIFICATION forming part of Letters Patent No. 229,919, dated July 13, 1880.

Application filed December 17, 1879.

*To all whom it may concern:*

Be it known that I, JOSEPH C. SEBRING, of Mill Creek township, Wabaunsee county, and State of Kansas, have invented a certain new and useful Improvement in Grain-Drills, of which the following is a full, clear, and exact description, reference being had to the accompanying drawings, forming part of this specification.

My invention consists in certain improvements in the construction of the seed-tube, deflector, and share, whereby the grain shall be deflected outwardly, forwardly, and to each side in equal quantity, the stoppage of the flow by the choking of the deflector indicated, a secure attachment afforded for the share, and, by reason of the peculiar shape of such share, a very efficient cutting and distribution of the earth over the bottom of the furrow, as will be hereinafter explained.

In the drawings, Figure 1 is a side view. Fig. 2 is a longitudinal section at $x\ x$, Fig. 3. Fig. 3 is a horizontal section at $x'\ x'$, Fig. 1, enlarged, showing the deflector and share in top view. Fig. 4 is a transverse section at $x^2\ x^2$, Fig. 3. Fig. 5 is an enlarged perspective view.

A is the seed-tube, having the usual construction and connection with the frame of the machine.

The lower end of the bore B may be made flaring to enlarge at $b$, to allow the grain to fly outward after falling on the deflector C, or the enlargement may be dispensed with and the deflector made smaller or placed lower than shown.

The deflector is made of somewhat conical or convex shape upon the upper side, so that the grain falling upon it will be deflected outward, forwardly, and to the sides, so that it is spread evenly over the whole of the bottom of the furrow, instead of being crowded in a narrow line, as usual.

The advantage I seek to give is to insure a vigorous growth to the young plants by giving each its separate space to grow without the interference of other plants in contact with it or in very close proximity.

The lower end of the seed-tube has an outturned flange, $a$, to which the share D is bolted.

The share has an angular horizontal cutting-edge, $d$, say one inch and a half, more or less, below the level of the deflector, so as to cut a flat-bottomed furrow below the said deflector, allowing space for the grain to spread. Behind the cutting edge or nose $d$ is an upwardly-inclined part, $d'$, which carries up the earth onto the wings $d^2$, upon which the earth is supported while the grain is spreading outward beneath it.

The rear ends, $d^3$, of the wings extend backward behind the seed-tube, as shown, extending farther back from the tube toward the outer edge, so that the earth will fall inward from the extensions $d^3$ and cover the grain behind the tube.

It will be understood that the earth on the share is parted by the tube A, and without some provision to reunite it behind the tube the grain at that place would be insufficiently covered.

The share has an upwardly-extending lug, $d^4$, bolted at $a^2$ to the front side of the tube A.

$a'$ is an oblique hole at the rear side of the tube, to indicate when the discharge of the seed-tube is stopped, for then the grain backs up and runs out of the hole $a'$.

I claim as my invention—

1. The seed-tube A, having at its bottom outturned flange $a$, and an oblique orifice, $a'$, in its lower part for indicating the chokage of the deflector C, as described.

2. The share D, having angular horizontal cutting edge or nose $d$, upwardly-inclined portion $d'$, downwardly-inclined wings $d^2$, having pointed rear ends, $d^3$, substantially as and for the purpose described.

JOSEPH C. SEBRING.

Witnesses:
SAML. KNIGHT,
GEO. H. KNIGHT.